3,281,462
PREPARATION OF ACETIC ANHYDRIDE BY THE CATALYZED OXIDATION OF ACETALDEHYDE IN THE PRESENCE OF A MIXTURE OF BORIC ACID AND OXALIC ACID

Gregor H. Riesser, Pasadena, Tex., and Robert F. Smith, Woodbury, N.J., assignors to Shell Oil Company, New York, N.Y., a corporation of Delaware
No Drawing. Filed May 22, 1963, Ser. No. 282,234
5 Claims. (Cl. 260—546)

The present invention relates to an improved method for the production of acetic anhydride.

It is already known to convert acetaldehyde to acetic anhydride through an autoxidation process in the presence of various metal compounds as oxidation catalysts, see, e.g., U.S. 2,575,159.

It is the principal object of this invention to provide an improved method for producing acetic anhydride from acetaldehyde.

It has now been found that the oxidation of acetaldehyde and production of acetic anhydride in the presence of a metal compound oxidation catalyst is improved by carrying out the process in the presence of a small proportion of a mixture of boric acid and oxalic acid. The use of the boric acid and oxalic acid mixture in the system results in a substantial increase in yield of acetic anhydride over the yield obtained in the absence of this mixture.

The boric acid and oxalic acid mixture can be used in a concentration of from about 0.1% to about 3% based upon the weight of acetaldehyde, 0.5% to 2% being preferred, with the mole ratio of the two acids being from 1:10 to 10:1, preferably from 1:4 to 4:1; an equimolar mixture is especially useful. Concentrations of the mixture of about 1% calculated on the amount of starting material have proved extremely satisfactory. There must be at least a small proportion of each acid present in the mixture, for only a very slight reaction occurs when one of the acids is left out of the mixture.

The reaction is carried out at superatmospheric pressure and below 100° C. Usually the temperature is in the range of from about 20° C. to about 80° C. A temperature of 40 to 70° C., for example around 60° C., is especially useful and is preferred. The reaction is generally carried out at relatively low superatmospheric pressures, approximately from 10 p.s.i.g. to 70 p.s.i.g., with a pressure of 60 p.s.i.g. working very satisfactorily. Higher or lower pressures may be utilized if desired.

Various known metal salt oxidation catalysts for oxidation of acetaldehyde may be used, as adequately described in the prior art, preferably as lower hydrocarbon monocarboxylate, especially acetate, or water-soluble oxy-salt of a non-volatile, difficultly oxidizable inorganic acid, especially sulfates. In particular, such metal salts as cobalt acetate, manganous acetate, and manganous sulfate are useful.

The process may be carried out in a continuous flow or in a batch operation. Higher yields of acetic anhydride are obtainable in a continuous or flow system in which the acetic anhydride is rapidly and continuously separated from the by-product water, thereby reducing the hydrolysis to acetic acid.

The invention will be more fully understood by consideration of the following examples, which are given to illustrate the practice and advantages of the invention and should not be construed to limit the invention since the variation of certain factors will be well understood by those skilled in the art.

Example I

A mixture of 100 grams of acetaldehyde and 2 grams of manganous acetate was placed in a glass Parr reactor and cooled to —50° C. by a Dry Ice-acetone bath. One gram of boric-oxalic acid mixture (1:1 molar ratio) was then added and the reactor placed on a shaking hydrogenation apparatus where the reactor was flushed twice with oxygen, pressured to 40 p.s.i.g and heated to 60° C. A Parr gas reservoir connected to the glass Parr reactor was pressured to 65 p.s.i.g with oxygen and the valve between the reactor and reservoir was opened. The pressure was maintained at between 60 p.s.i.g and 65 p.s.i.g. during the course of the run. The amount of reacted oxygen was measured by the pressure decreases in the reservoir. When absorption of oxygen stopped, the reaction mixture was cooled, neutralized with three grams of calcium acetate, filtered, and analyzed by gas-liquid chromatography. The reaction time was approximately 3 hours and 20 minutes. In two different experiments, the acetic anhydride in the recovered product was 40% and 32% by weight, representing yields of approximately 30% and 25%, respectively; the remainder was mostly acetic acid.

Example II

The procedure was the same as for Example I except that the run was stopped after only three-fourths as much oxygen had been absorbed. The recovered reaction mixture was 52% by weight acetic anhydride, a 40% yield.

Example III

Similar experiments to those in Example I were carried out, except that in III–A boric acid replaced the boric-oxalic acid and in III–B oxalic acid replaced the boric-oxalic acid. In III–A the recovered reaction mixture contained only 4.7% by weight acetic anhydride while in III–B it contained only 10.9% by weight acetic anhydride.

We claim as our invention:

1. In the process of producing acetic anhydride by contacting acetaldehyde with oxygen in the presence of a metal salt catalyst at a temperature from about 20° C. to about 80° C. and a pressure from 10 p.s.i.g to 70 p.s.i.g., the improvement which comprises conducting said contacting in the additional presence of from about 0.1% by weight to about 3% by weight based on the weight of acetaldehyde of a mixture of boric acid and oxalic acid wherein the molar ratio of boric acid to oxalic acid is from 1:10 to 10:1.

2. The process of claim 1 wherein the metal salt catalyst is a manganese salt.

3. The process of claim 2 wherein the manganese salt is manganous acetate.

4. The process of claim 1 wherein the mixture of boric acid and oxalic acid is present in an amount from about 0.5% by weight to about 2% by weight based on the acetaldehyde, and the molar ratio of boric acid to oxalic acid present in said mixture is from 1:4 to 4:1.

5. The process of claim 4 wherein the molar ratio of boric acid to oxalic acid is 1:1.

References Cited by the Examiner

UNITED STATES PATENTS 2,575,159  11/1951  Chassaing et al. _____ 260—546
3,192,256  6/1965  Mac Lean et al. ____ 260—530 X

OTHER REFERENCES

Babkin: "Chemical Abstracts," vol. 53 (1959), page 13736i, QD1.A51.

LORRAINE A. WEINBERGER, *Primary Examiner.*

RICKARD K. JACKSON, *Examiner.*